(12) United States Patent  
Suzuki

(10) Patent No.: US 7,827,570 B2  
(45) Date of Patent: Nov. 2, 2010

(54) CARTRIDGE LOCKING MECHANISM AND TRAY LOCKING MECHANISM FOR CARTRIDGE DRIVE APPARATUS

(75) Inventor: Takeshi Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 1310 days.

(21) Appl. No.: 11/146,159

(22) Filed: Jun. 7, 2005

(65) Prior Publication Data

US 2005/0270688 A1 Dec. 8, 2005

(30) Foreign Application Priority Data

Jun. 8, 2004 (JP) ............................. 2004-169741

(51) Int. Cl.  
*G11B 17/04* (2006.01)

(52) U.S. Cl. .................. 720/630; 720/610; 720/637; 720/639; 360/96.51

(58) Field of Classification Search .............. 360/96.51; 720/610, 630, 637, 639, 657  
See application file for complete search history.

(56) References Cited

U.S. PATENT DOCUMENTS

| | | | | |
|---|---|---|---|---|
| 3,957,225 | A * | 5/1976 | Vogel ....................... | 242/338.4 |
| 4,727,444 | A * | 2/1988 | Fukushima et al. ......... | 720/637 |
| 5,757,578 | A * | 5/1998 | Shimoyama et al. ..... | 360/96.51 |
| 5,933,400 | A * | 8/1999 | Kabasawa .................... | 720/656 |
| 6,320,722 | B1 | 11/2001 | Tsuchiya et al. | |
| 6,437,938 | B1* | 8/2002 | Wada .......................... | 360/95 |
| 6,560,062 | B1* | 5/2003 | Kovacs ..................... | 360/96.51 |
| 2003/0103291 | A1 | 6/2003 | Tsuchiya | |

FOREIGN PATENT DOCUMENTS

| | | |
|---|---|---|
| EP | 1 094 458 A2 | 4/2001 |
| EP | 1 316 953 A2 | 6/2003 |
| JP | 49-74014 | 7/1974 |
| JP | 50-4133 | 2/1975 |
| JP | 53-20215 | 6/1978 |
| JP | 63-90055 | 4/1988 |
| JP | 63-130939 | 8/1988 |
| JP | 63-57864 | 11/1988 |
| JP | 61-137260 | 6/1989 |
| JP | 3-181052 | 8/1991 |
| JP | 4-101938 | 9/1992 |
| JP | 5-59635 | 8/1993 |

(Continued)

OTHER PUBLICATIONS

Japaenese Office Action dated Jun. 18, 2008 with an English translation.

*Primary Examiner*—William J Klimowicz  
*Assistant Examiner*—Carlos E Garcia  
(74) *Attorney, Agent, or Firm*—McGinn Intellectual Property Law Group, PLLC

(57) ABSTRACT

A cartridge tray is supported to be movable relative to a frame and capable of receiving a cartridge inserted thereinto. The cartridge tray comprises a cartridge locking lever for locking the cartridge to the cartridge tray, and a lever guard for enabling the cartridge locking lever to act to lock the cartridge to the cartridge tray when the cartridge is inserted into the cartridge tray. With the provision of the lever guard, the cartridge locking lever is prevented from transitioning to a locking state even if the tray locking lever is unlocked while no cartridge is accommodated in the cartridge tray.

20 Claims, 12 Drawing Sheets

FOREIGN PATENT DOCUMENTS

| | | |
|---|---|---|
| JP | 6-33565 | 8/1994 |
| JP | 6-325449 | 11/1994 |
| JP | 7-9230 | 3/1995 |
| JP | 7-86991 | 9/1995 |
| JP | 10-340508 | 12/1998 |
| JP | 3047585 | 3/2000 |
| JP | 2001-118305 | 4/2001 |
| JP | 2002-032943 | 1/2002 |
| JP | 3308945 | 5/2002 |
| JP | 2002-237117 | 8/2002 |
| JP | 2003-173596 | 6/2003 |

\* cited by examiner

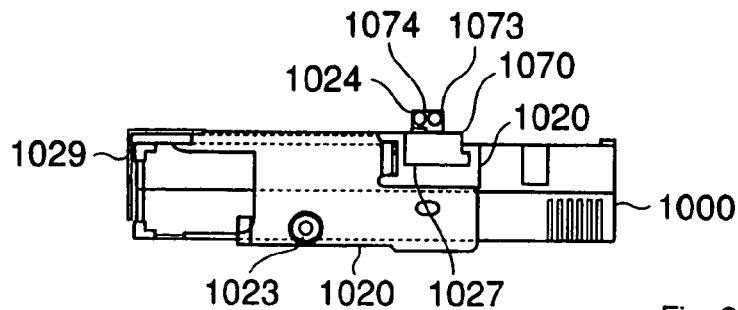
Fig. 2A (Prior Art)
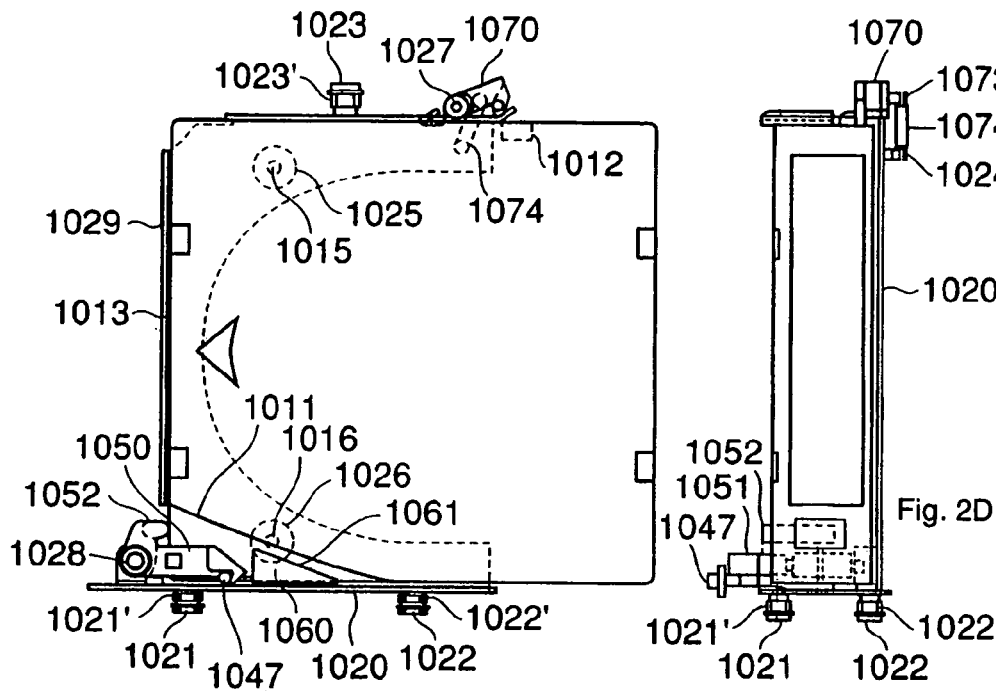
Fig. 2D (Prior Art)
Fig. 2B (Prior Art)
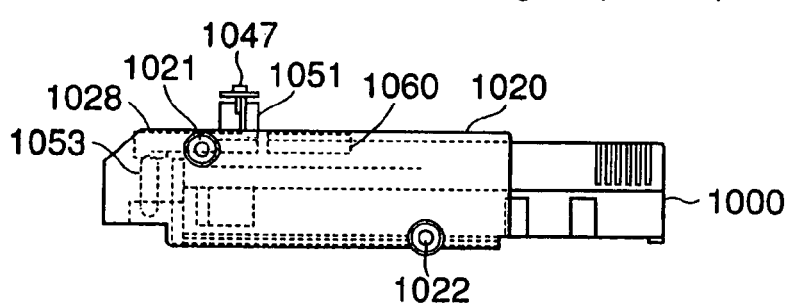
Fig. 2C (Prior Art)

CARTRIDGE LOCKING MECHANISM AND TRAY LOCKING MECHANISM FOR CARTRIDGE DRIVE APPARATUS

BACKGROUND OF THE INVENTION

1. Field of the Invention

The present invention relates to a cartridge tray to be incorporated in a cartridge drive apparatus, and more particularly, to a cartridge tray to be incorporated in a cartridge drive apparatus which is for use with cartridge media such as a magnetic tape cartridge.

2. Description of the Related Art

Conventionally, a known cartridge drive apparatus comprises a protection mechanism against erroneous cartridge insertion, as disclosed, for example, in Japanese patent application laid-open No. 2001-118305. FIGS. 1A to 6 are diagrams illustrating the configuration of the conventional cartridge drive apparatus disclosed in Japanese patent application laid-open No. 2001-118305.

Referring first to FIGS. 1A and 1B, magnetic tape cartridge 1000 has recess 1011 in an upper region of a left side in an inserting direction, and locking hole 1012 in a lower region of a right side. End face 1013 in the inserting direction is flat. Cartridge 1000 is mounted with reel face gear 1014 on the back surface thereof and is formed with positioning holes 1015, 1016 extending into the back surface.

A loading mechanism for loading cartridge 1000 into the cartridge drive apparatus is composed of cartridge tray 1020 (see FIGS. 2A to 2D) for holding cartridge 1000; a loader plate (not shown) for sliding cartridge tray 1020; and a loader guide plate (not shown) which has guide grooves for cartridge tray 1020 and a loader plate to slide therealong.

Referring next to FIGS. 2A to 2D, cartridge tray 1020 has bearings 1021-1023 and bearings 1021'-1023' arranged coaxially on both left and right sides thereof. Holes 1025, 1026 are formed through cartridge tray 1020 in a lower region thereof for spring hook pin 1024 and positioning pins 1082, 1083 to extend therethrough, respectively. Further, cartridge tray 1020 comprises cartridge tray end face 1029 to which end face 1013 of cartridge 1000 abuts in the inserting direction. Also, cartridge tray 1020 comprises cartridge locking lever 1070 for securely holding cartridge 1000 when it is loaded; tray locking lever 1050 for preventing an erroneous loading operation when cartridge is inserted by error; and stopper 1060 for preventing an erroneous insertion of cartridge 1000.

Referring now to FIG. 3, cartridge locking lever 1070 is rotatably mounted to pin 1027 which is fixed on the right side of cartridge tray 1020. Hook 1071 is mounted at the leading end of cartridge locking lever 1070, and the lower portion of cartridge locking lever 1070 has bent inclination 1072. Cartridge locking lever 1070 is pulled toward the inner face of cartridge tray 1020 by spring 1074 which is stretched between spring hook pin 1073 mounted to a lower portion of cartridge locking lever 1070 and spring hook pin 1024 mounted on the back surface of cartridge tray 1020.

Referring next to FIG. 4, tray locking lever 1050 is rotatably mounted to pin 1028 which is fixed in a rear region of cartridge tray 1020, and tray locking lever 1050 is pulled toward the inner wall of cartridge tray 1020 by spring 1053 stretched between tray locking lever 1050 and pin 1028. Hook 1051 is mounted at the leading end of tray locking lever 1050, and cam 1052 is disposed near the trailing end of tray locking lever 1050.

Referring further to FIG. 4, stopper 1060 is mounted on the top of the left side of cartridge tray 1020 for preventing an erroneous insertion of cartridge 1000, and is formed in a triangle shape having slope 1061 such that it does not prevent an insertion of cartridge 1000 when it is inserted in a correct orientation.

Describing next the operation of the protection mechanism against erroneous cartridge insertion described above, cartridge tray 102 and loader plate 1030 are positioned near a cartridge insertion port before a loading operation, as illustrated in FIGS. 2A-2D and the like. In this event, cartridge locking lever 1070 is forced open because slope 1072 is in contact with pin 1081 which is fixed on a deck base, as illustrated in FIG. 3. Also, since because hook 1051 is caught by locking pin 1047 as illustrated in FIG. 4, tray locking lever 1050 is locked to disable the loading, such that cartridge tray 1020 is not allowed to slide.

As illustrated in FIGS. 2A to 2D, as cartridge 1000 is inserted into cartridge tray 1020 in the correct orientation, stopper 1060 comes into recess 1011, and end face 1013 comes into contact with cam 1052 which is pushed deep into the apparatus, causing tray locking lever 1050 to rotate about pin 1028. Then, hook 1051 comes off locking pin 1047 to release the loading disabled state, causing cartridge end face 1013 to abut to cartridge tray end face 1029 (see FIG. 5). In response, cartridge tray 1020 and loader plate 1030, which are further pushed deep into the apparatus, begin sliding along a horizontal portion of a bearing rail (not shown) and along a top bearing rail (not shown), causing cartridge locking lever 1070 to come off pin 1081, bringing hook 1071 into engagement with locking hole 1012 by spring 1074, with the result that cartridge 1000 is securely held by cartridge tray 1020 (see FIG. 6).

If cartridge 1000 is erroneously inserted into cartridge tray 1020 in an erroneous orientation, cartridge 1000 is blocked by slope 1061 of stopper 1060, so that the disabled loading state is not released. In this way, according to the conventional mechanism described above, when cartridge 1000 is inserted into cartridge tray 1020 in the correct orientation, the disabled loading state is released at substantially the same position as a position at which the cartridge is securely locked, thereby making it possible to prevent erroneous loading operations.

FIGS. 7A and 7B illustrate the cartridge tray shown in FIG. 2B, as viewed from the back side thereof. It should be noted that for convenience of illustration, FIGS. 7A and 7B partially depict the configuration of tray locking lever 1050 and cartridge locking lever 1070 in a perspective view.

As illustrated in FIG. 7A, when no cartridge 1000 is accommodated in cartridge tray 1020, hook 1051 of tray locking lever 1050 is caught by locking pin 1047, resulting in the disabled loading state in which cartridge tray 1020 is prevented from sliding. On the other hand, cartridge locking lever 1070 is caught by pin 1081, thus preventing hook 1071 from projecting toward the inner wall of cartridge tray 1020.

However, if vibrations or a shock are applied to the apparatus for some reason (for example, vibrations during transportation or the like) in this state, hook 1051 of tray locking lever 1050 may come off locking pin 1047, causing tray locking lever 1050 to rotate in an X-direction as illustrated in FIG. 7B. As a result, cartridge tray 1020 is enabled to slide, so that as cartridge tray 1020 moves in a direction indicated by arrow Y1 in FIG. 7B due to vibrations or shock, cartridge locking lever 1070 comes off pin 1081 and is rotated by the force of spring 1053 in a direction indicated by arrow Z in FIG. 7B up to a locking position shown in FIG. 7B. In this event, hook 1071 of cartridge locking lever 1070 projects toward the inner wall of cartridge tray 1020.

Cartridge 1020 is urged by a spring, not shown, to move in a direction indicated by arrow Y2 in FIG. 7B, but after cartridge locking lever 1070 has rotated as shown in FIG. 7B, the leading end of cartridge locking lever 1070 is in abutment to pin 1081, thus inhibiting cartridge tray 1020 from returning to the original position. Accordingly, cartridge locking lever 1070 will not be returned to the position indicated in FIG. 7A by the urging force of the spring. As a result, hook 1071 of cartridge locking lever 1070 remains projecting toward the inner wall of cartridge tray 1020. With hook 1071 projecting toward the inner wall of cartridge tray 1020, even if an attempt is made to insert cartridge 1000 into cartridge tray 1020, the corner of cartridge 1000 will run against hook 1071, so that cartridge 1000 cannot be inserted into cartridge tray 1020.

As described above, in the conventional mechanism configuration, if tray locking lever 1050 is unlocked for some reason, cartridge locking lever 1070 can be brought into a locking state due to unlocked tray locking lever 1050, possibly resulting in the inability to insert cartridge 1000 into cartridge tray 1020.

SUMMARY OF THE INVENTION

It is an object of the present invention to provide a cartridge tray which is capable of preventing a cartridge locking mechanism from transitioning to a locking state when no cartridge is inserted into the cartridge tray.

A cartridge tray according to one aspect of the present invention is supported to be movable relative to a frame, and capable of receiving a cartridge inserted thereinto. The cartridge tray includes a cartridge locking mechanism locking the cartridge to the cartridge tray, and a cartridge lock actuating mechanism enabling the cartridge locking mechanism to act to lock the cartridge to the cartridge tray when the cartridge is inserted into the cartridge tray.

According to the cartridge tray of the present invention configured as described above, the cartridge lock actuating mechanism acts only after the cartridge is inserted into the cartridge tray to bring the cartridge locking mechanism into a locking state. It is therefore possible to prevent the cartridge locking mechanism from transitioning to the locking state even though no cartridge is accommodated in the cartridge tray which would otherwise prevent the cartridge from being inserted into the cartridge tray.

Further, the cartridge lock actuating mechanism may includes a protrusion capable of projecting into the interior of the cartridge tray, an urging member urging the protrusion to project into the interior of the cartridge tray, and a tab preventing the cartridge locking mechanism from acting to lock the cartridge to the cartridge tray when the protrusion remains projecting into the interior of the cartridge tray. According to the cartridge lock actuating mechanism configured as described above, as the cartridge is inserted into the cartridge tray, the protrusion, which projects into the interior of the cartridge tray, is moved by the cartridge in a direction so that the protrusion is pushed outside of the cartridge tray. Then, the tab, which has prevented the cartridge locking mechanism from acting to lock the cartridge, moves away from the cartridge locking mechanism, permitting the cartridge locking mechanism to act to lock the cartridge.

The cartridge tray may further include a tray locking mechanism locking the cartridge tray to the frame, wherein the tray locking mechanism may be configured to unlock the cartridge tray from the frame when the cartridge is completely inserted into the cartridge tray. The cartridge tray in this configuration is also similar in that the cartridge lock actuating mechanism acts only after the cartridge is inserted into the cartridge tray to bring the cartridge locking mechanism into a locking state. Thus, even if the tray locking mechanism is unlocked for some reason while no cartridge is accommodated in the cartridge tray, this will not result in a transition of the cartridge locking mechanism to the locking state.

A cartridge tray according to another aspect of the present invention is supported to be movable relative to a frame, and capable of receiving a cartridge inserted thereinto. The cartridge tray includes a cartridge locking mechanism locking the cartridge to the cartridge tray, a tray locking mechanism locking the cartridge tray to the frame and configured to unlock the cartridge tray from the frame when the cartridge is completely inserted into the cartridge tray, and an auxiliary tray locking mechanism locking the cartridge tray to the frame, disposed near an opening of the cartridge tray, and being configured to unlock the cartridge tray from the frame when the cartridge is inserted through the opening of the cartridge tray. The cartridge locking mechanism is configured to remain in an unlocking state before the cartridge is inserted into the cartridge tray, and to transition to a locking state when the cartridge is inserted into the cartridge tray to unlock the auxiliary tray locking mechanism and the tray locking mechanism to permit the cartridge tray to move relative to the frame.

According to the cartridge tray configured as described above, the auxiliary tray locking mechanism is unlocked as the cartridge is inserted through the opening of the cartridge tray, and the tray locking mechanism is unlocked when the cartridge is completely fitted in the cartridge tray, making the cartridge tray movable relative to the frame. Subsequently, when the cartridge tray starts moving relative to the frame, the cartridge locking mechanism locks the cartridge.

In the foregoing configuration, the auxiliary tray locking mechanism is likewise unlocked only after the cartridge is inserted into the cartridge tray. Therefore, even if the tray locking mechanism becomes unlocked for some reason while no cartridge is accommodated in the cartridge tray, the cartridge tray is kept locked to the frame by the auxiliary tray locking mechanism, so that the cartridge tray will not move relative to the frame to bring the cartridge locking mechanism into a locking state. It is therefore possible to prevent the cartridge locking mechanism from transitioning to the locking state even though no cartridge is accommodated in the cartridge tray which would otherwise prevent the cartridge from being inserted into the cartridge tray. In a scenario contrary to the foregoing where the auxiliary tray locking mechanism becomes unlocked for some reason while no cartridge is accommodated in the cartridge tray, it goes without saying that the tray locking mechanism acts to prevent the cartridge tray from unlocking from the frame.

Further, the frame may include a pressing member pressing the cartridge tray in a direction so that the cartridge tray is placed at a predetermined position relative to the frame.

The above and other objects, features and advantages of the present invention will become apparent from the following description with reference to the accompanying drawings which illustrate examples of the present invention.

BRIEF DESCRIPTION OF THE DRAWINGS

FIGS. 2A to 2D are a left side view, a top plan view, a right side view, and a front view, respectively, illustrating a cartridge which is inserted into a prior art cartridge tray in a correct orientation;

DETAILED DESCRIPTION OF THE PREFERRED EMBODIMENTS

First Embodiment

Figure 8A:
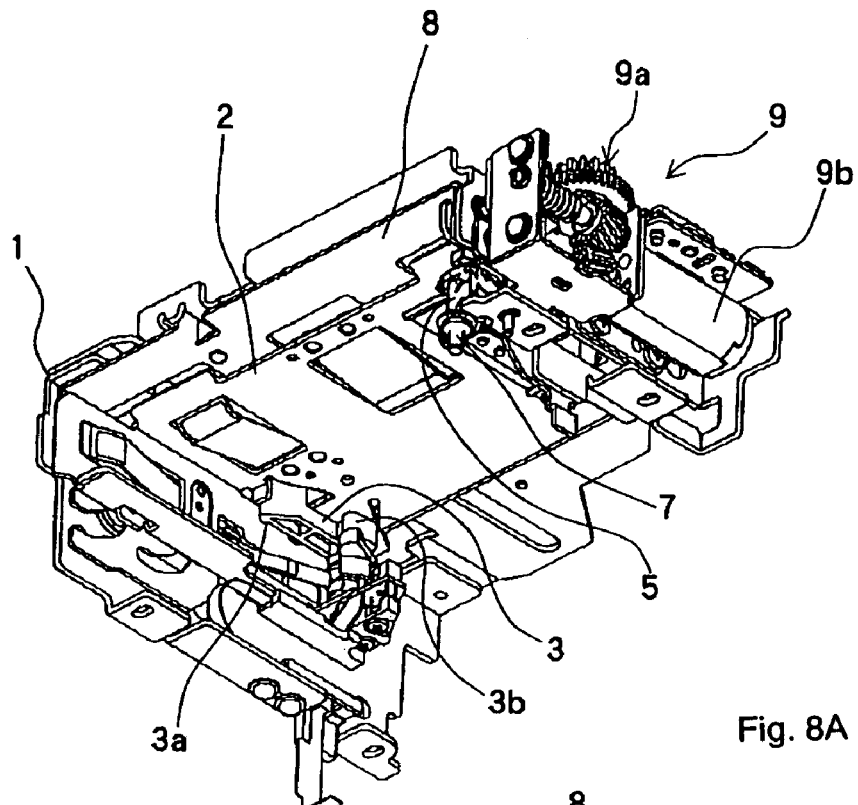
FIGS. 8A and 8B are perspective views each illustrating a cartridge drive apparatus which comprises a cartridge locking mechanism according to a first embodiment of the present invention.
Figure 8B:
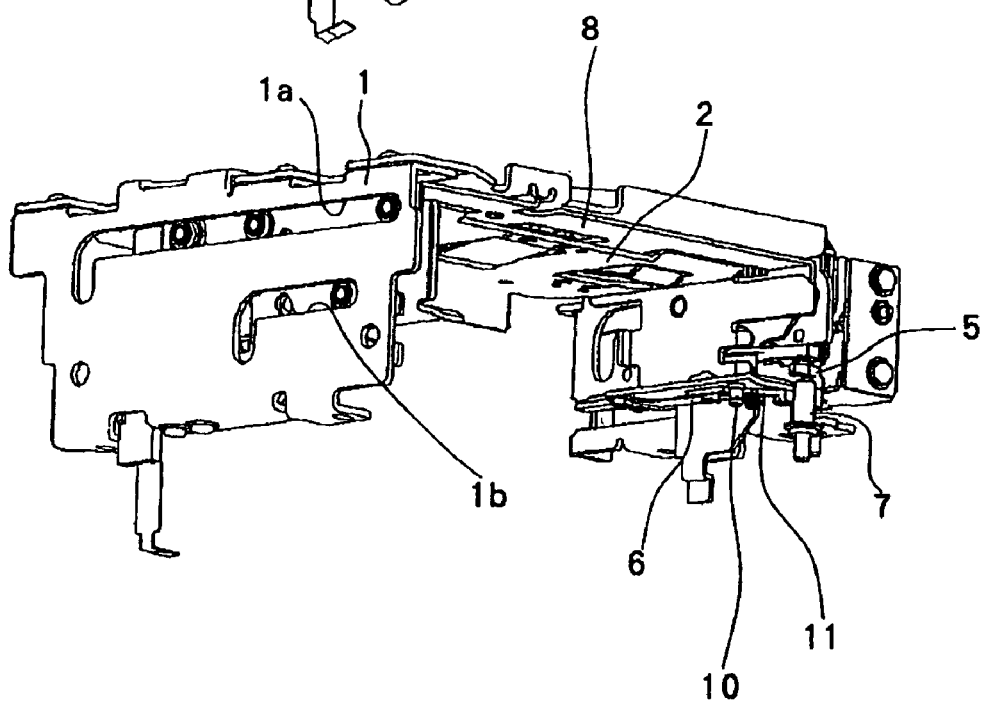

FIGS. 8A and 8B are perspective views each illustrating a cartridge drive apparatus which comprises a cartridge tray according to a first embodiment of the present invention, where FIG. 8A illustrates the cartridge drive apparatus as viewed from an obliquely downward direction, and FIG. 8B 8A illustrates the cartridge drive apparatus as viewed from an obliquely forward direction.

The cartridge drive apparatus comprises frame 1 formed with symmetric guide grooves 1a, 1b along both sides; loader plate 8 arranged to be movable within frame 1 along first guide groove 1a; and cartridge tray 2 supported by loader plate 8 and arranged to be movable within frame 1 along second guide groove 1b. Frame 1 comprises driver 9 which includes gear 9a and motor 9b, such that loader plate 8 is driven by driver 9 to slide along first guide groove 1a. Cartridge tray 2 is moved along second guide groove 1b in association with movements of loader plate 8.

Similar to the conventional cartridge tray illustrated in FIGS. 2A-2D and the like, cartridge tray 2 of this embodiment also comprises tray locking lever 3 which serves as a tray locking mechanism for locking cartridge tray 2 to frame 1, and cartridge locking lever 5 which serves as a cartridge locking mechanism for locking a cartridge inserted into cartridge tray 2.

Figure 9:
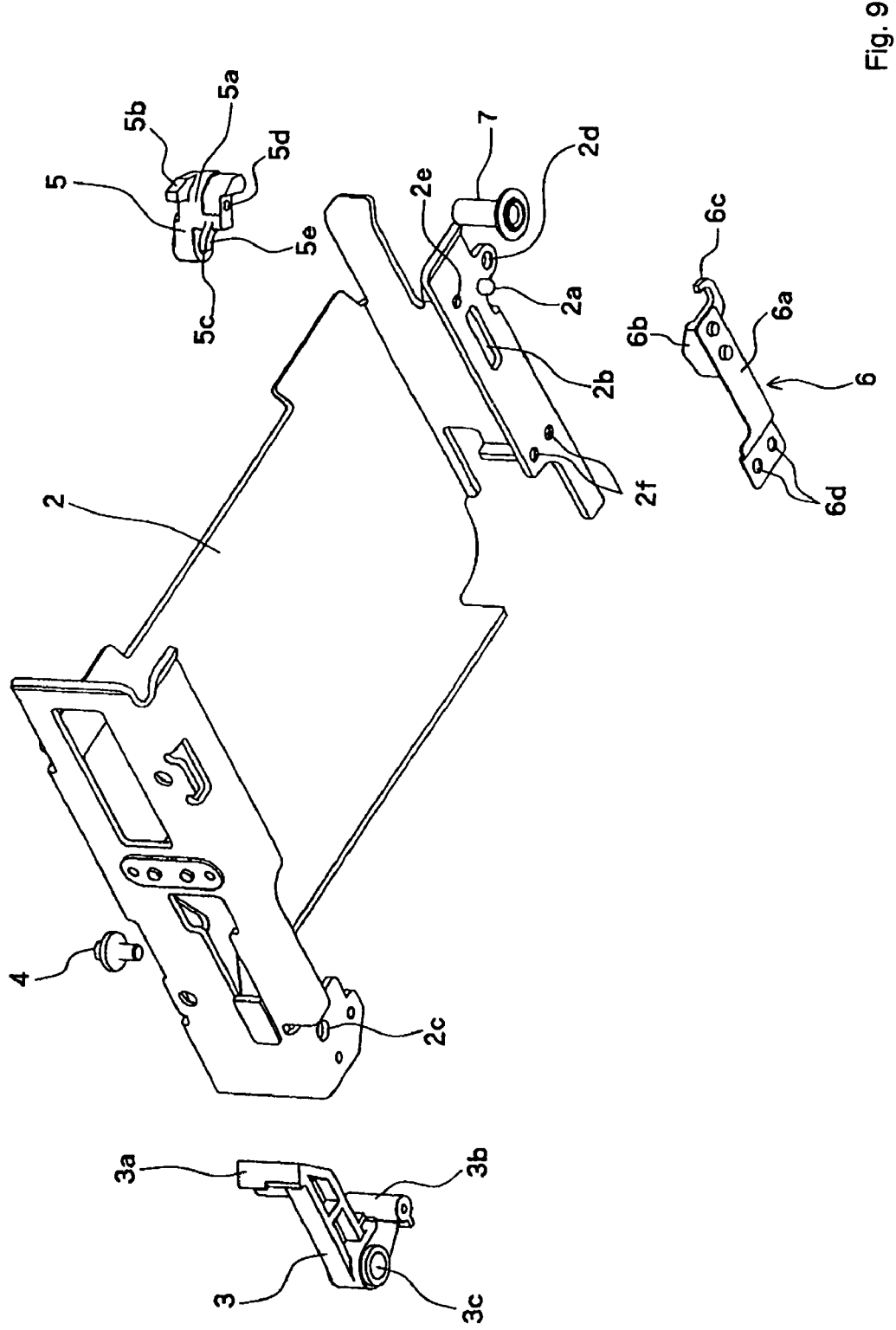
FIG. 9 is an exploded perspective view illustrating a cartridge tray shown in FIGS. 8A and 8B.

FIG. 9 is an exploded perspective view illustrating the cartridge tray shown in FIGS. 8A and 8B.

Likewise, in this embodiment, tray locking lever 3 comprises hook 3a which is caught by pin 4 mounted on frame 1; and cam 3b which is pushed by the front end face of a cartridge when the cartridge is inserted into cartridge tray 2. Tray locking lever 3 is mounted to cartridge tray 2 for rotation about shank hole 4c by a pin (not shown) which extends through pin hole 2c of cartridge tray 2. Tray locking lever 3 is urged by a spring, not shown, in a direction in which hook 3a is caught by pin 4. This tray locking lever 3 is similar in structure to the tray locking lever of the conventional cartridge tray illustrated in FIGS. 2A-2D and the like.

Cartridge locking lever 5 has abutting face 5a which abuts to cartridge locking lever releasing pin 4 mounted on frame 1; and hook 5b for engagement in a locking groove of a cartridge inserted into cartridge tray 2. Cartridge locking lever 5 is mounted to cartridge tray 2 for rotation about shank hole 5c by a pin (not shown) which extends through shank hole 2a of cartridge tray 2. After cartridge locking lever 5 is mounted to cartridge tray 2 by a pin, not shown, spring 10 is wound around a pin (not shown) that is inserted into pin hole 5d of cartridge locking lever 5 and pin 11 (see FIG. 8B) that is inserted into pin hole 2e of cartridge tray 2, such that cartridge locking lever 5 is urged by spring 10 to rotate about shank hole 5c toward the inner wall of cartridge tray 2. As will be appreciated, the respective components described above in connection with cartridge locking lever 5 are similar to those associated with the cartridge locking lever of the conventional cartridge tray illustrated in FIGS. 2A-2D and the like.

In addition to the components listed above, cartridge tray 2 of this embodiment comprises lever guard 6 which functions as a cartridge lock actuating mechanism. Lever guard 6 comprises spring plate 6a which is an urging member; and pressing member 6b attached on the top of spring plate 6a near the leading end thereof. Tab 6c extends from pressing member 6b toward the leading end of spring plate 6a. Pressing member 6b including tab 6c may be molded, for example, using a resin material or the like. Lever guard 6 is fixed to cartridge tray 2 by screws or the like which extend through fixing hole 6d formed through spring plate 6a near the trailing end thereof and through fixing hole 2f formed through cartridge tray 2, respectively. With lever guard 6 fixed to cartridge tray 2, pressing member 6b projects above cartridge tray 2 through hole 2b formed through cartridge tray 2. Also, tab 6c surrounds bump 2a formed on the bottom surface of cartridge tray 2. As well, the leading end of tab 5e, formed on cartridge locking lever 5, abuts to tab 6c.

Alternatively, lever guard 6 may employ another urging member such as a twisted coil spring in place of spring plate 6a as mentioned above.

Now, the cartridge tray of this embodiment will be described below in greater detail with reference to FIGS. 10-12.

Figure 10:
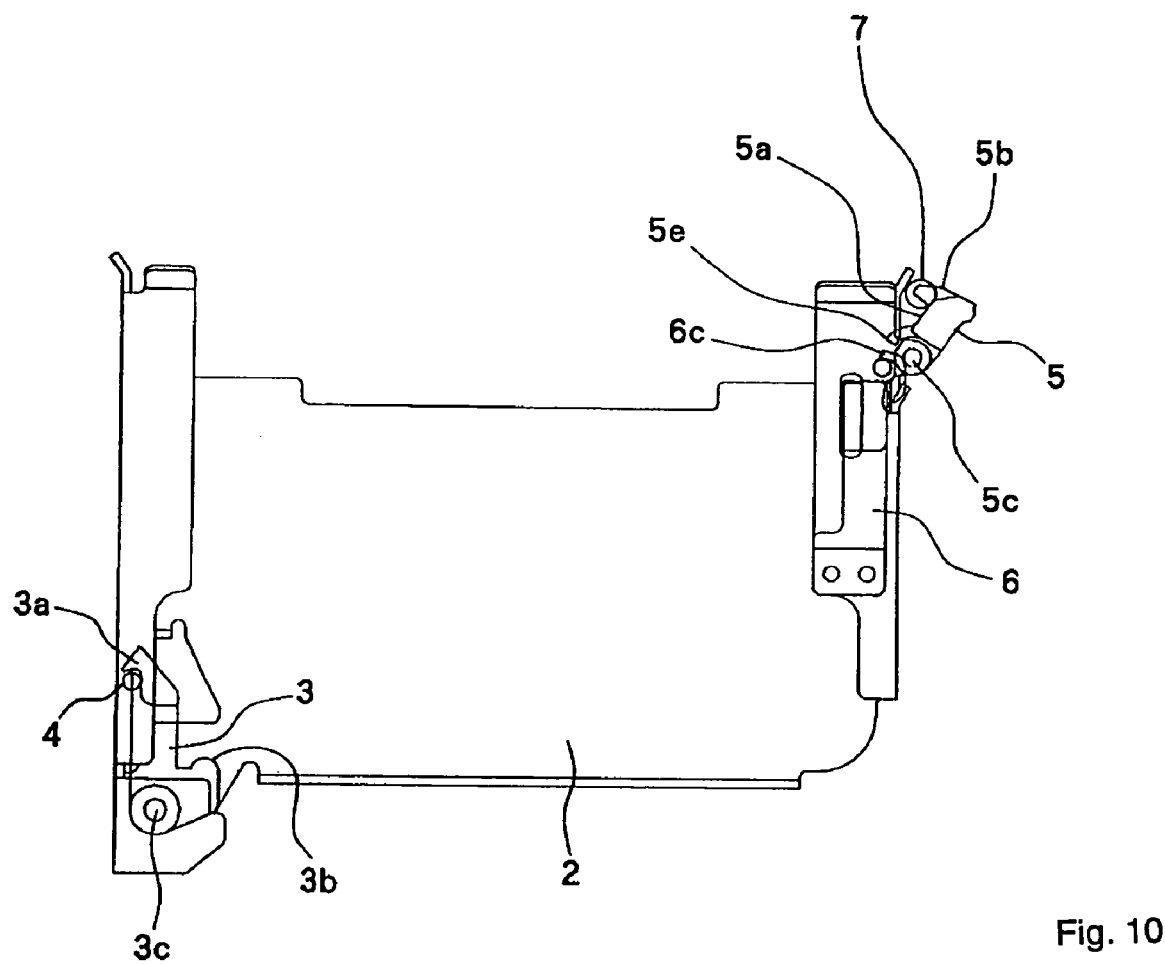
FIG. 10 illustrates a cartridge tray, as viewed from below, which is not loaded with a cartridge.

FIG. 10 illustrates the cartridge tray, viewed from below, when no cartridge is inserted thereinto. For convenience of illustration, the respective components of tray locking lever 3 and cartridge locking lever 5 are shown in perspective view in FIG. 10.

In the normal state before a cartridge is inserted into cartridge tray 2, tray locking lever 3 has hook 3a caught by pin 4, while cartridge locking lever 5 has abutting face 5a in abutment to cartridge locking lever releasing pin 7, so that hook 5b is prevented from projecting toward the inner wall of cartridge tray 2. In other words, cartridge tray 2 is locked to frame 1 (see FIGS. 8A and 8B) and is therefore ready to receive a cartridge inserted thereinto.

Figure 11A:
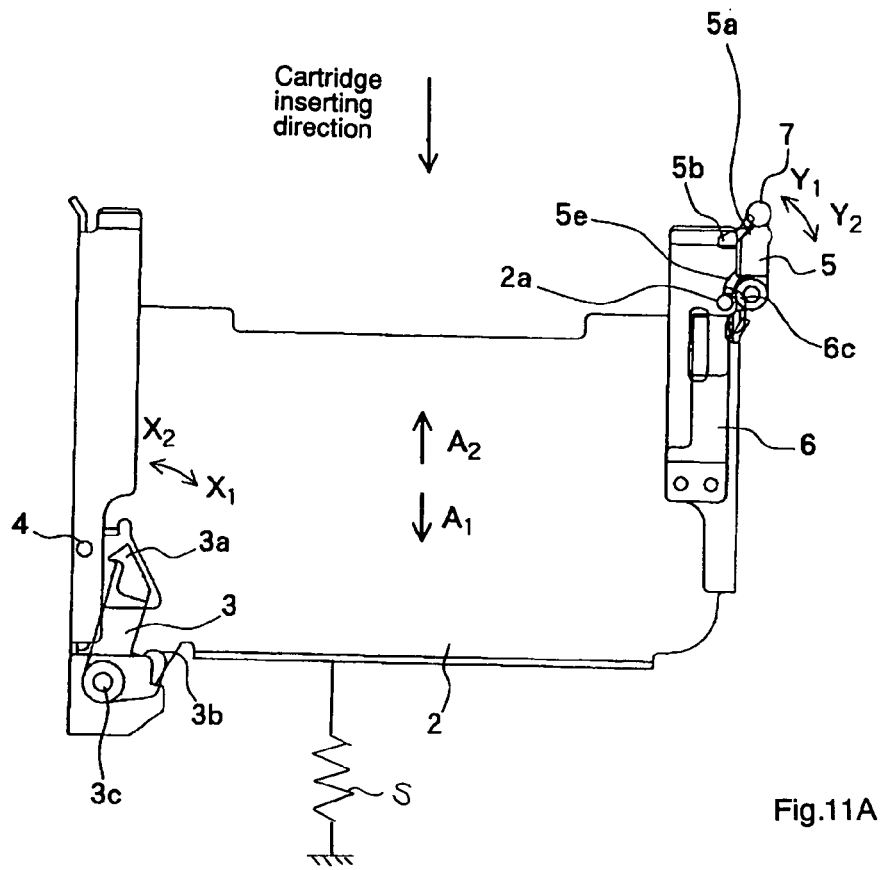
FIGS. 11A and 11B are a bottom view and a right side view, respectively, of the cartridge tray which is loaded with a cartridge.
Figure 11B:
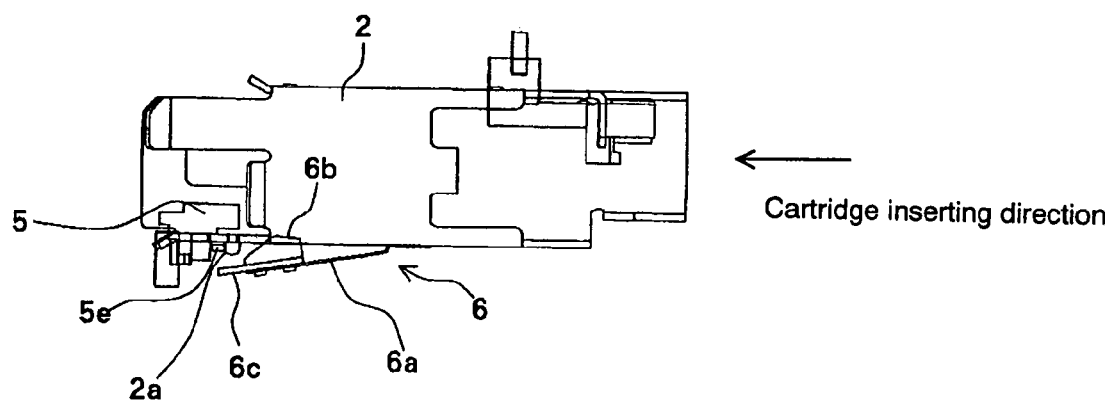

FIGS. 11A and 11B each illustrate the cartridge tray when a cartridge is inserted thereinto, where FIG. 11A is a view taken from below, and FIG. 11B is a view taken from the right side. FIGS. 11A and 11B omit the illustration of the cartridge.

When cam 3b of tray locking lever 3 is pushed by the front end face of the cartridge inserted into cartridge tray 2, tray locking lever 3 is rotated about shank hole 3c in a direction indicated by arrow X1 in FIG. 11A, against the urging force of a spring (not shown), causing pin 4 to come off hook 3a. This unlocks cartridge tray 2 from frame 1, so that cartridge tray 2 becomes movable relative to frame 1 in a direction indicated by arrow A1 in FIG. 11A.

Pressing member 6b of lever guard 6 is pushed down to the bottom surface of the cartridge, resulting in deflection of spring plate 6a downward of cartridge tray 2 (in a direction away from cartridge tray 2). As a result, tab 6c of lever guard 6, which has supported tab 5e of cartridge locking lever 5, moves away from tab 5e, permitting cartridge locking lever 5 to rotate to a position at which tab 5e abuts to bump 2a.

As described above, cartridge tray 2 has been unlocked from frame 1, and is now movable relative to frame 1 in the direction indicated by arrow A1 in FIG. 11A. Thus, cartridge locking lever 5 rotates in a direction indicated by arrow Y1 in FIG. 11A by the urging force of spring 11 (see FIG. 8B) while dragging abutting face 5a along pin 7, and causing an associated rotation of cartridge tray 2, pushed in the direction indicated by arrow A1, to a position (cartridge locking position) indicated in FIG. 11A. As a result, hook 5b of cartridge locking lever 5 moves toward the inner wall of cartridge tray 2, and comes into engagement with a locking groove (not shown) of the cartridge. The cartridge inserted into cartridge tray 2 is locked in cartridge tray 2 through the foregoing operation.

While cartridge tray 2 is pressed in a direction indicated by arrow A2 in FIG. 11A by spring S that is connected to frame 1 as a pressing member, spring S has a force smaller than the force of spring 11 of cartridge locking lever 5 which acts to move cartridge tray 2 in the direction indicated by arrow A1 in FIG. 11A in the manner described above.

Figure 1A:
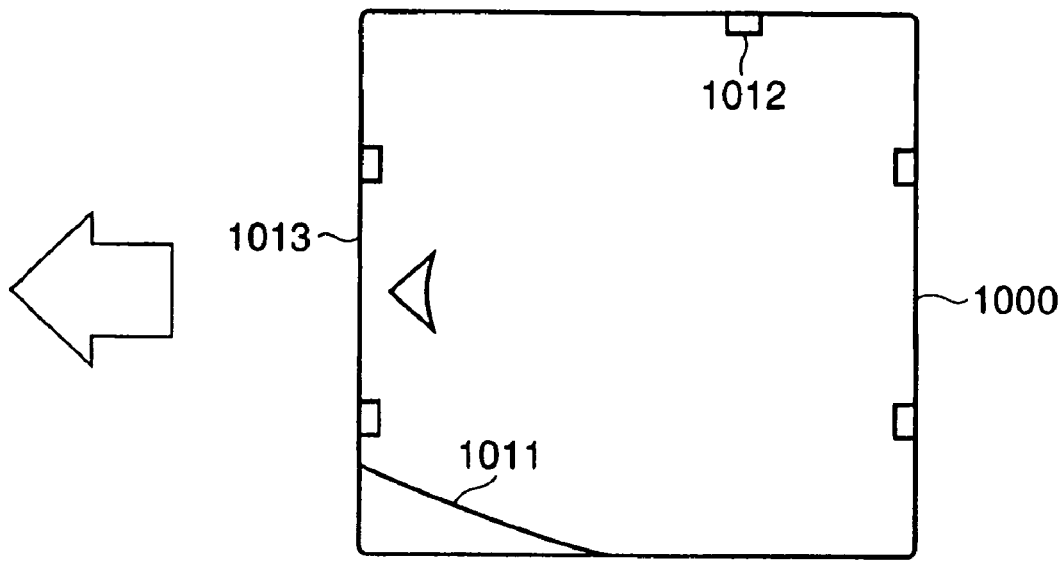
FIG. 1A is a top plan view illustrating a cartridge.
Figure 1B:
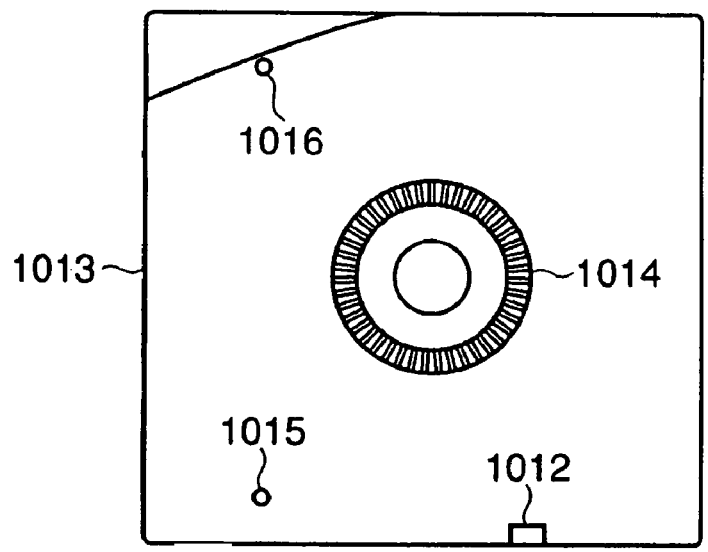
FIG. 1B is a bottom view illustrating the cartridge.
Figure 3:
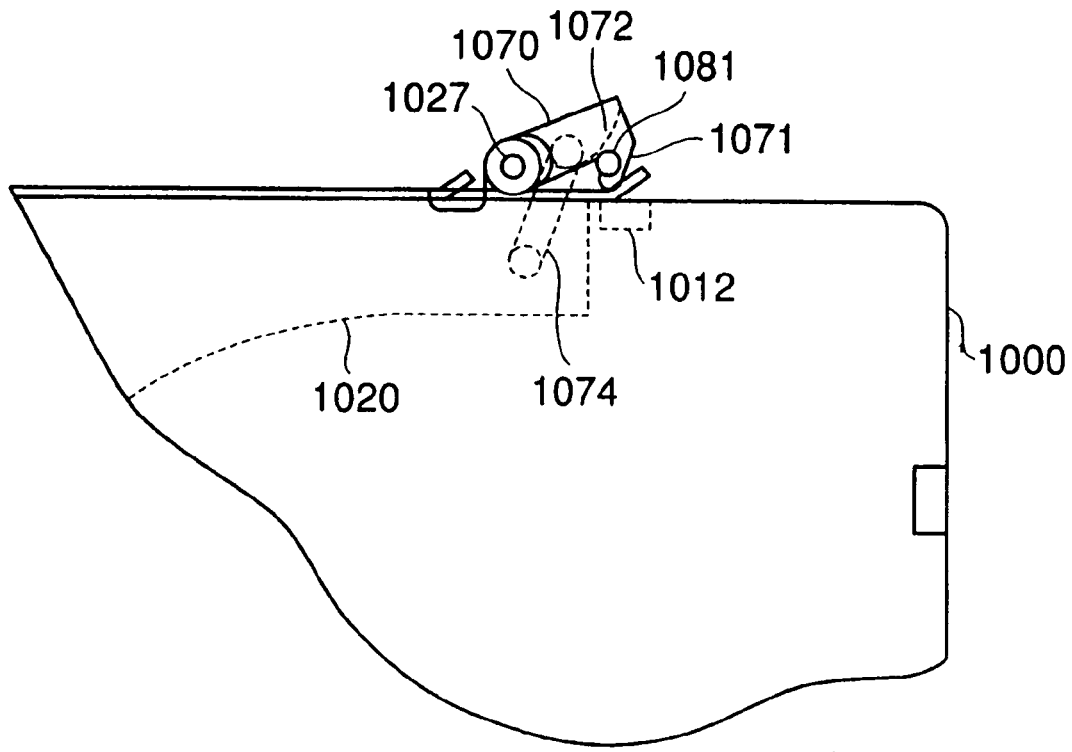
FIG. 3 is a partially enlarged top plan view of the cartridge illustrated in FIGS. 2A to 2D in the vicinity of a hook, showing a cartridge locking mechanism which is unlocked prior to a loading operation.
Figure 4:
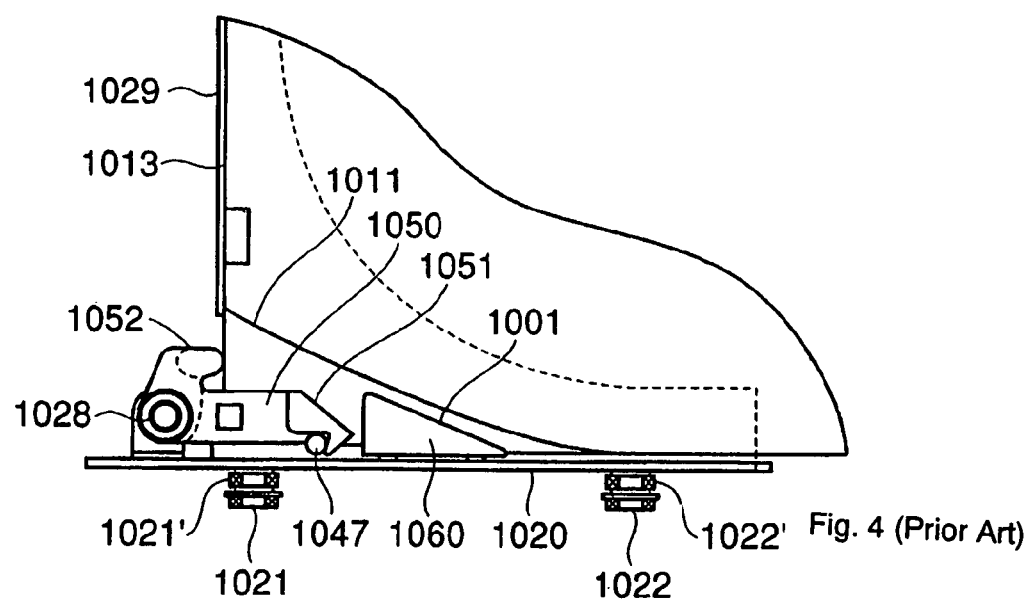
FIG. 4 is a partially enlarged top plan view of the cartridge illustrated in FIGS. 2A to 2D in the vicinity of a tray locking lever, showing the loading locking mechanism which is locked prior to the loading operation.
Figure 5:
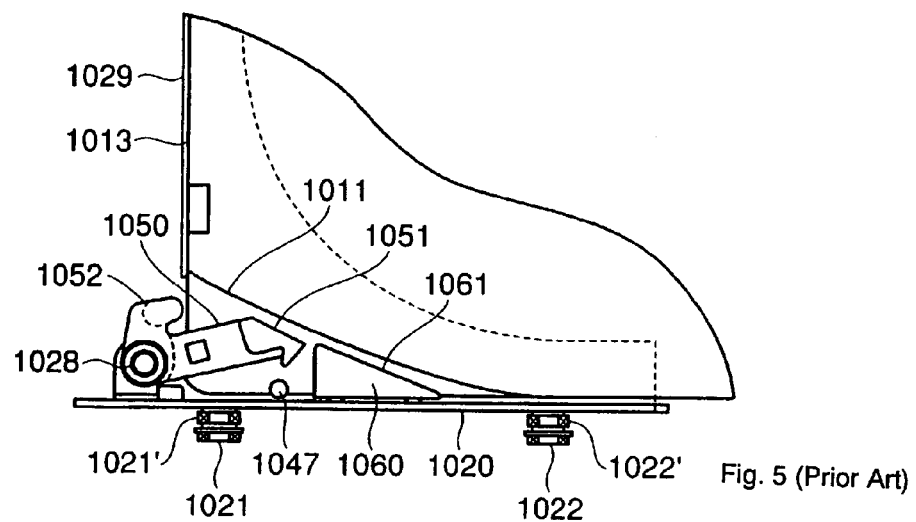
FIG. 5 is a partially enlarged top plan view of the cartridge illustrated in FIGS. 2A to 2D in the vicinity of the tray locking lever, showing the loading locking mechanism which is unlocked after the loading operation.
Figure 6:
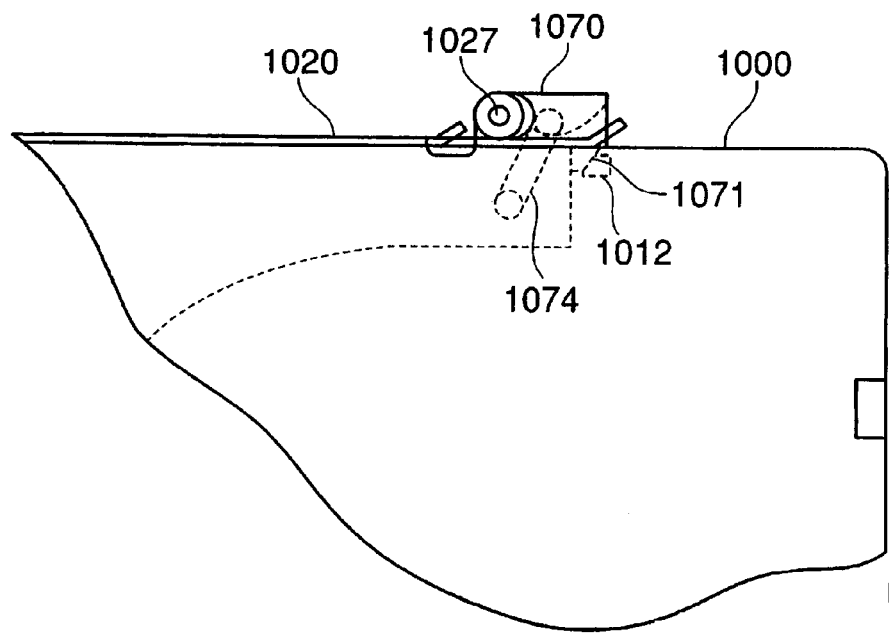
FIG. 6 is a partially enlarged top plan view of the cartridge illustrated in FIGS. 2A to 2D in the vicinity of the hook, showing the cartridge locking mechanism which is locked after the loading operation.
Figure 7B:
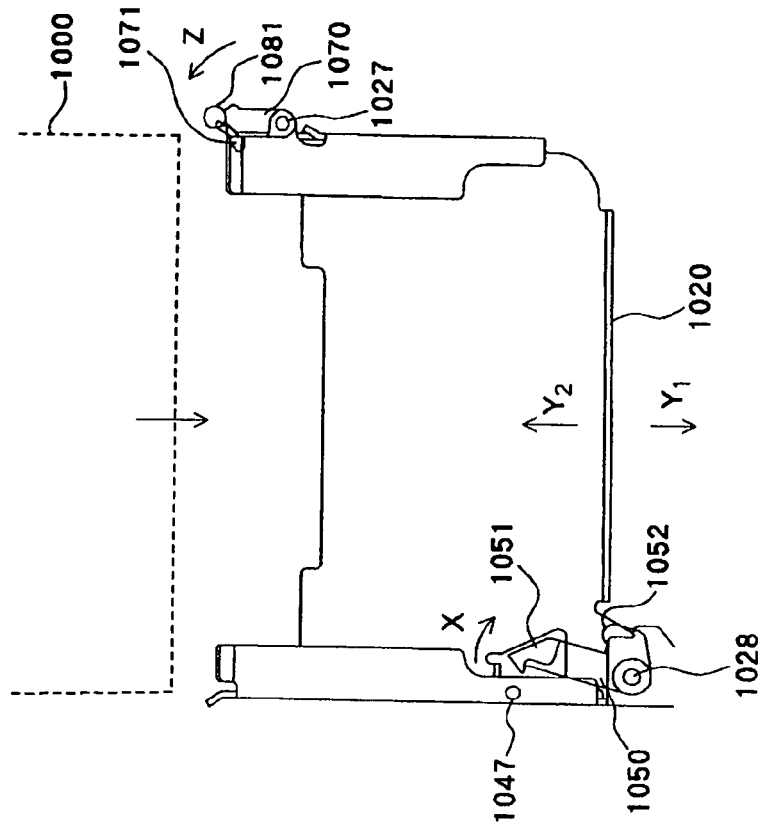
FIGS. 7A and 7B depict the cartridge tray illustrated in FIGS. 2A to 2D, as viewed from the back side.
Figure 7A:
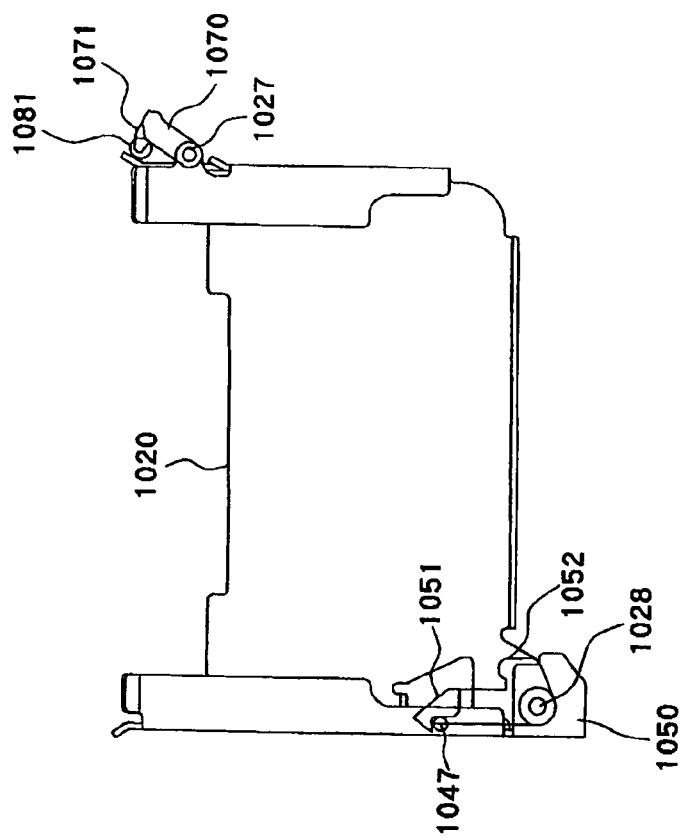

As the cartridge has been accommodated in cartridge tray 2 in the foregoing manner, loader plate 8 is driven by driver 9 of the cartridge drive apparatus illustrated in FIG. 8A, causing cartridge tray 2 to carry the cartridge to a predetermined operating position. With the cartridge remaining in the operating position, an information write/read operation is performed on the recording medium contained therein. Upon termination of the read/write operation on the recording medium in the cartridge, the cartridge is carried back again to the position indicated in FIG. 4 by the action of driver 9.

As the cartridge is withdrawn in the direction indicated by arrow A2 in FIG. 11A from the state illustrated in FIGS. 11A and 11B, hook 5b locked in the locking groove of the cartridge is pushed in the direction indicated by arrow A2 in FIG. 11A. In response, cartridge locking lever 5 rotates in the direction indicated by arrow Y2 in FIG. 11A, while abutting face 5a thereof slides along pin 7, with an associated movement of cartridge tray 2 in the direction indicated by A2 in FIG. 11A. As a result, cartridge locking lever 5 returns to a lock releasing position indicated in FIG. 10. In this event, tab 5e of cartridge locking lever 5 moves away from bump 2a of cartridge 2, and the cartridge, which has pushed down pressing member 6b of lever guard 6, is removed from cartridge tray 2, permitting spring plate 6a, which has been deflected, to regain with its own restoring force. On the other hand, tray locking lever 3 is rotated in the direction indicated by arrow X2 in FIG. 11A by a spring, not shown, causing hook 3a to return to a position at which pin 4 is caught by hook 3a, as illustrated in FIG. 10. In other words, after the cartridge has been removed from cartridge tray 2, both levers 3, 5 of cartridge tray 2 return to their respective original positions indicated in FIG. 10.

Figure 12A:
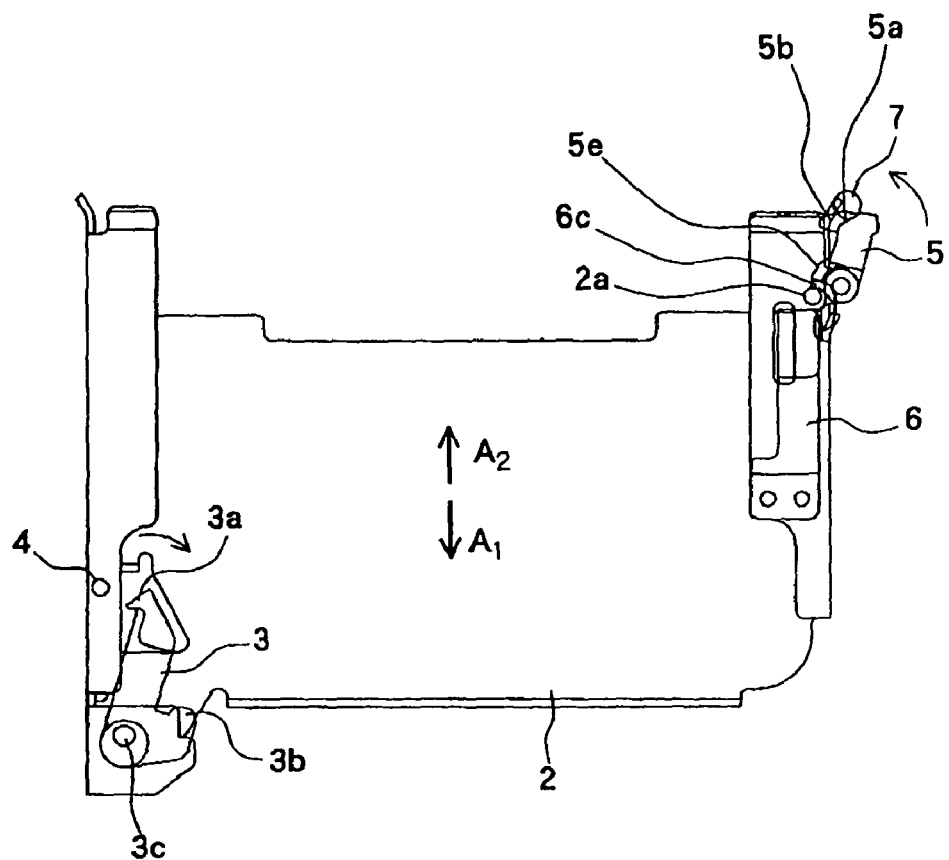
FIGS. 12A and 12B are a bottom view and a right side view, respectively, of the cartridge tray which has a tray locking lever coming off a pin though no cartridge is inserted thereinto.
Figure 12B:
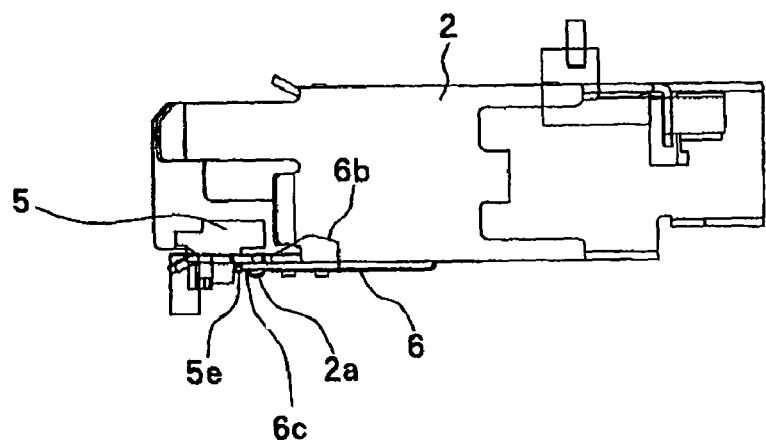

FIGS. 12A and 12B each illustrate the cartridge tray which has the tray locking lever coming off the pin though no cartridge is inserted thereinto, where FIG. 12A is a view of the cartridge tray taken from below, and FIG. 12B is a view of the cartridge tray taken from the right side.

If vibrations or shock are applied to the apparatus for some reason (for example, vibrations and the like during transportation), hook 3a of tray locking lever 3 can come off pin 4, unintentionally causing tray locking lever 3 to rotate in a direction indicated by the associated arrow in FIG. 12A. This makes cartridge tray 2 movable relative to frame 1 in a direction indicated by arrow A1 in FIG. 12A.

However, since no cartridge is accommodated in cartridge tray 2, pressing member 6b of lever guard 6 will not be pressed down. Thus, tab 5e of cartridge locking lever 5 is supported by tab 6c of lever guard 6, thereby preventing cartridge locking lever 5 from rotating from the position indicated in FIG. 12B in a direction indicated by the associated arrow shown in FIG. 12A. It should be noted that tab 6c of lever guard 6 is supported by bump 2a, even if it is pressed by tab 5e of cartridge locking lever 5, so that tab 6c will not be bent.

Consequently, hook 5b of cartridge locking lever 5 will not project toward the inner wall of cartridge tray 2, and cartridge locking lever 5 will also not rotate to produce a force which would move cartridge tray 2 in the direction indicated by arrow A1 in FIG. 12A. Further, with cartridge locking lever 5 staying at the position indicated in FIG. 12A (cartridge unlocking position), even if cartridge tray 2 attempts to move in the direction indicated by arrow A1 in FIG. 12A, cartridge tray 2 is prevented from moving by cartridge locking lever 5 in abutment to frame 1 (see FIGS. 8A and 8B). Therefore, cartridge tray 2 is maintained at a position at which abutting face 5a of cartridge locking lever 5 abuts to pin 7 (the position indicated in FIG. 12A) by an urging force applied by a spring, not shown, in the direction indicated by arrow A2 shown in FIG. 12A.

As described above, since cartridge tray 2 in the first embodiment comprises lever guard 6, cartridge locking lever 5 will not transition to the locking state even if tray locking lever 3 is unlocked when no cartridge is accommodated in cartridge tray 2. Consequently, since a cartridge can be inserted into cartridge tray 2 even in such a situation, the cartridge drive apparatus will not be prevented from performing its appropriate operations.

Likewise, in the foregoing scenario, when a cartridge accommodated in cartridge tray 2 is removed from the cartridge drive apparatus, both levers 3, 5 of cartridge tray 2 operate in a similar manner to the cartridge removing operation as described with reference to FIGS. 11A and 11B to return to their original positions indicated in FIG. 10.

Second Embodiment

Figure 13:
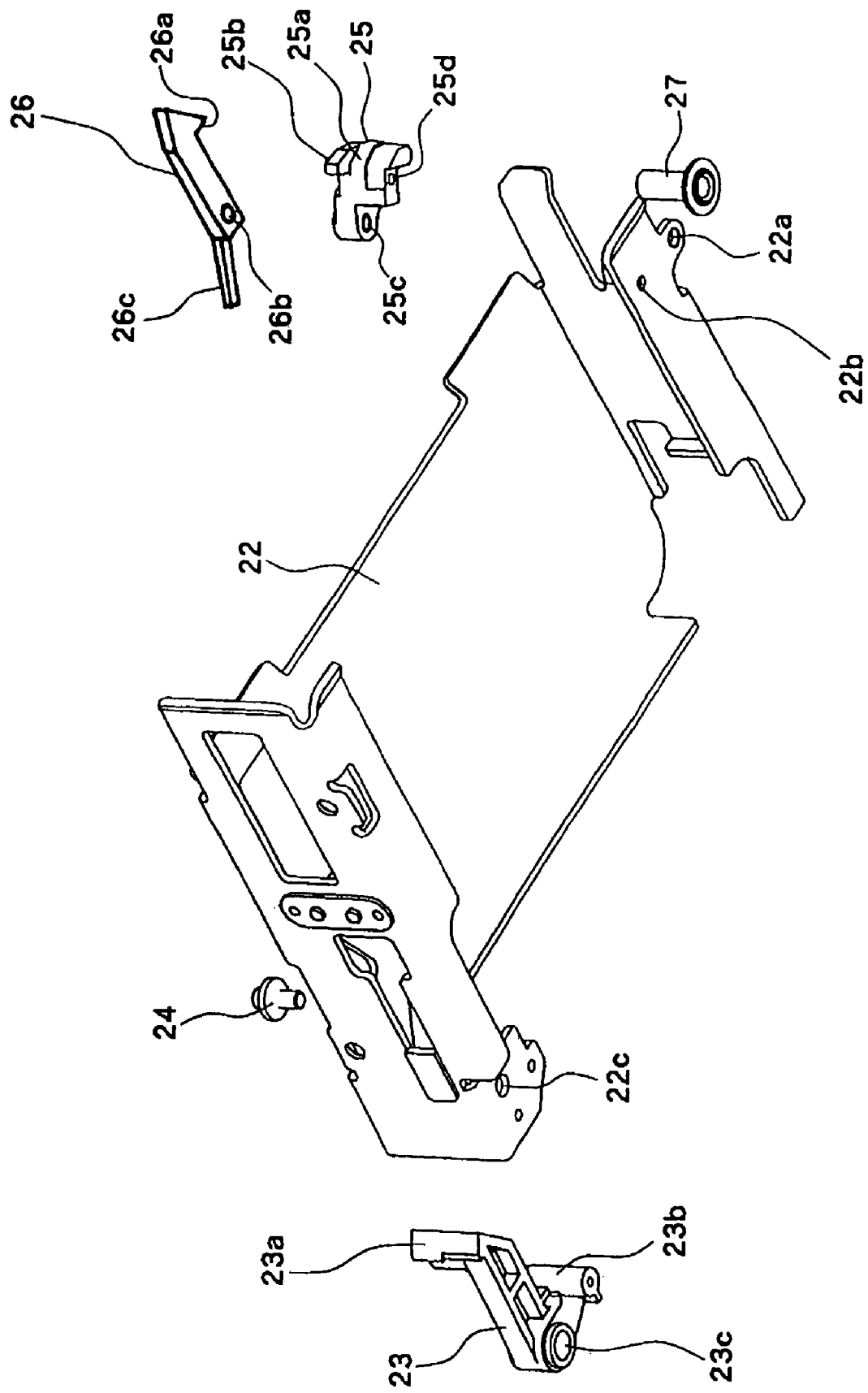
FIG. 13 is an exploded perspective view illustrating a cartridge tray according to a second embodiment of the present invention.

FIG. 13 is an exploded perspective view illustrating a cartridge tray according to a second embodiment of the present invention.

In this embodiment, lever guard 6 in the first embodiment illustrated in FIG. 9 and the like is replaced by auxiliary tray locking lever 26 disposed near an opening of cartridge tray 22 as an auxiliary tray locking mechanism. It should be noted that the remaining components such as cartridge tray 22, tray locking lever 23, cartridge locking lever 25 and the like in this embodiment are substantially similar to those in the first embodiment, except that cartridge tray 22 of the second embodiment is not formed with bump 2a, hole 2b, or fixing hole 2f shown in FIG. 9, and cartridge locking lever 25 of the second embodiment does not include tab 5e shown in FIG. 9. A cartridge drive apparatus comprises cartridge tray 22 of the second embodiment and is similar in configuration to that shown in the first embodiment.

Auxiliary tray locking lever 26 comprises hook 26a which is caught by pin 28 (see FIGS. 14A and 14B) attached to a frame (not shown) of the apparatus; shank hole 26b; and arm 26c which extends in a direction opposite to hook 26a from shank hole 26b. Auxiliary tray locking lever 26 is mounted to cartridge tray 2 for rotation about shank hole 26b by a pin (not shown) which extends through shank hole 22a of cartridge tray 22 and shank hole 25c of cartridge locking lever 25. In other words, auxiliary tray locking lever 26 and cartridge locking lever 25 are coaxially rotatably supported by a single pin (not shown) which extends through shank holes 26b, 25c.

Figure 14A:
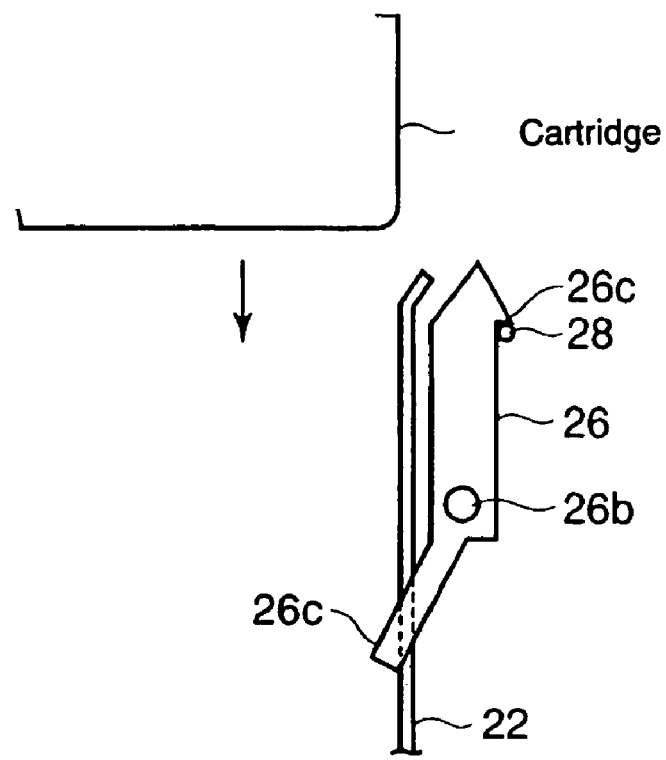
FIGS. 14A and 14B are diagrams each illustrating a positional relationship between the cartridge tray and auxiliary tray locking lever shown in FIG. 13, and the operation of the auxiliary tray locking lever.
Figure 14B:
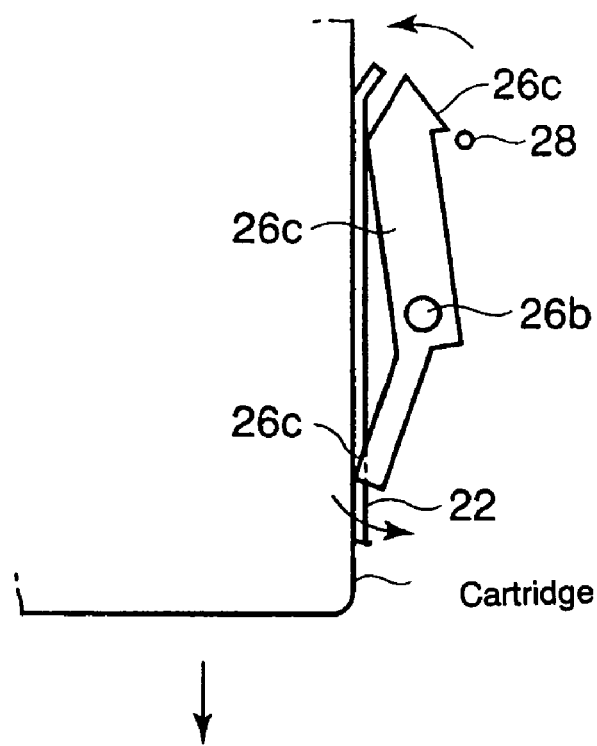

FIGS. 14A and 14B are diagrams each illustrating a positional relationship between the cartridge tray and the auxiliary tray locking lever shown in FIG. 13, and the operation of the auxiliary tray locking lever. It should be noted that FIGS. 14A and 14B omit the illustration of cartridge locking lever 25.

FIG. 14A illustrates how auxiliary tray locking lever 26 appears before a cartridge is inserted into cartridge tray 22. The state illustrated in FIG. 14A corresponds to the state illustrated in FIG. 10, where tray locking lever 23 is caught by pin 24, and cartridge locking lever 25 is in an unlocking state in which abutting face 25a is in abutment to pin 27. Auxiliary tray locking lever 26 is urged by a spring, not shown, or the like such that hook 26a rotates in a direction so that it is caught by pin 28. In this state, hook 26a is caught by pin 28 of the frame.

Even if vibrations are applied to the apparatus, for example, during transportation, tray locking lever 23 and auxiliary tray locking lever 26 will simultaneously act to come off associated pins 24, 28, respectively, with a probability lower than a probability with which only one of levers 23, 26 acts to come off pin 24 or 28. Therefore, even if vibrations or the like cause tray locking lever 23 to come off pin 24, the cartridge is kept locked to the frame (not shown), as long as auxiliary tray locking lever 26 remains caught by pin 28, so that cartridge tray 22 will not move relative to the frame. Thus, tray locking lever 23, which has acted to come off pin 24, is returned to the original position by the spring which urges lever 23, and is again caught by pin 24.

In this way, auxiliary tray locking lever 26 acts to prevent cartridge tray 22 from unlocking from the frame even if tray locking lever 23 comes off pin 24. In a contrary scenario where auxiliary tray locking lever 26 comes off pin 28, it goes without saying that tray locking lever 23 acts to prevent cartridge tray 22 from unlocking from the frame.

Also, in the state illustrated in FIG. 14A (cartridge locking lever 25 is in an unlocking state), at least part of arm 26c of auxiliary tray locking lever 26 projects into an internal space of cartridge tray 22.

In this event, if a cartridge is inserted into the opening of cartridge tray 22, auxiliary tray locking lever 26 rotates about shank hole 26b in a direction indicated by arrows in FIG. 14B such that arm 26c is pushed away and outside cartridge tray 22 by the side of the cartridge. In response, hook 26a of auxiliary tray locking lever 26 comes off pin 28 to release auxiliary tray locking lever 26 from locking to the frame.

Subsequently, when cam 23b of tray locking lever 23 is pushed by the front end face of a cartridge which has been completely inserted into cartridge tray 22, tray locking lever 23 is rotated about shank hole 23c against the urging force of a spring (not shown), causing hook 23a to come off pin 24. Consequently, cartridge tray 22 is also released from locking to the frame, thus making cartridge tray 22 movable relative to the frame.

As described above, auxiliary tray locking lever 26 is unlocked from the frame only after a cartridge has been inserted into cartridge tray 22 in the second embodiment as well. Therefore, even if tray locking lever 23 acts to become unlocked with no cartridge accommodated in cartridge tray 22, cartridge tray 22 is still kept locked to the frame, so that cartridge tray 22 will not move relative to the frame to bring cartridge locking lever 25 into a locking state. Thus, even in such a situation, a cartridge can be inserted into cartridge tray 22, so that the cartridge drive apparatus will not be prevented from performing its appropriate operations.

While preferred embodiments of the present invention have been described using specific terms, such description is for illustrative purposes only, and it is to be understood that changes and variations may be made without departing from the spirit or scope of the following claims.

What is claimed is:

1. A cartridge tray supported to be movable relative to a frame, and capable of receiving a cartridge inserted thereinto, said cartridge tray comprising:
    a cartridge locking mechanism locking said cartridge to said cartridge tray; and
    a cartridge lock actuating mechanism that prevents said cartridge locking mechanism from acting when said cartridge is not inserted into said cartridge tray, and enables said cartridge locking mechanism to act to lock said cartridge to said cartridge tray when said cartridge is inserted into said cartridge tray, said cartridge lock actuating mechanism comprising:
        a protrusion capable of projecting into an interior of said cartridge tray;
        an urging member urging said protrusion to project into the interior of said cartridge tray; and
        a tab integrated with said protrusion, said tab preventing said cartridge locking mechanism from acting to lock said cartridge to said cartridge tray when said protrusion remains projecting into the interior of said cartridge tray,
    wherein, when said tab does not prevent said cartridge locking mechanism from rotating due to said protrusion being pushed out from the interior of said cartridge tray to an exterior of said cartridge tray by said cartridge when said cartridge is inserted into said cartridge tray, said cartridge locking mechanism acts to lock said cartridge to said cartridge tray, and
    wherein a plane, which is parallel to a rotation direction of said cartridge lock actuating mechanism, is perpendicular to a plane which is parallel to a rotation direction of said cartridge locking mechanism.

2. The cartridge tray according to claim 1, further comprising a tray locking mechanism locking said cartridge tray to said frame, said tray locking mechanism being configured to unlock said cartridge tray from said frame when said cartridge is completely inserted into said cartridge tray.

3. The cartridge tray according to claim 1, wherein said frame includes a pressing member pressing said cartridge tray in a direction so that said cartridge tray is placed at a predetermined position relative to said frame.

4. The cartridge tray according to claim 1, wherein said protrusion is attached to a top portion of said urging member near a leading end portion of said urging member.

5. The cartridge tray according to claim 4, wherein said tab extends from said protrusion to said leading end portion of said urging member.

6. The cartridge tray according to claim 1, wherein said protrusion comprises a resin material.

7. The cartridge tray according to claim 1, further comprising:
   a fastening member that extends through a fixing hole of said cartridge lock actuating mechanism and a corresponding fixing hole of said cartridge tray, said fixing hole of said cartridge lock actuating mechanism formed through said urging member near a trailing end portion thereof,
   wherein said cartridge lock actuating mechanism is fixed to said cartridge tray by said fastening member.

8. The cartridge tray according to claim 1, wherein said urging member comprises one of a twisted coil spring and a spring plate.

9. The cartridge tray according to claim 1, wherein, when said cartridge is removed from said cartridge tray after said cartridge has been pushing said protrusion and deflecting said urging member, said urging member regains an urging force to urge said protrusion to project into the interior of said cartridge tray.

10. The cartridge tray according to claim 1, wherein, when said cartridge is not in said cartridge tray, said protrusion is not displaced and said tab supports said cartridge locking mechanism, thereby preventing said cartridge locking mechanism from rotating to a position in which said cartridge locking mechanism acts to lock said cartridge to said cartridge tray.

11. The cartridge tray according to claim 1, wherein said rotation direction of said cartridge lock actuating mechanism comprises a direction in which said protrusion and said tab move when said cartridge lock actuating mechanism enables said cartridge locking mechanism to act to lock said cartridge, and
   wherein said rotation direction of said cartridge locking mechanism comprises a direction in which said cartridge locking mechanism rotates when said cartridge locking mechanism acts to lock said cartridge to said cartridge tray.

12. A cartridge tray supported to be movable relative to a frame, and capable of receiving a cartridge inserted thereinto, said cartridge tray comprising:
   a cartridge locking means for locking said cartridge to said cartridge tray; and
   a cartridge lock actuating means for preventing said cartridge locking means from acting when said cartridge is not inserted into said cartridge tray, and for enabling said cartridge locking means to act to lock said cartridge to said cartridge tray when said cartridge is inserted into said cartridge tray, said cartridge lock actuating means comprising:
      a protrusion capable of projecting into an interior of said cartridge tray;
      urging means urging said protrusion to project into the interior of said cartridge tray; and
      an engaging means preventing said cartridge locking means from acting to lock said cartridge to said cartridge tray when said protrusion remains projecting into the interior of said cartridge tray,
   wherein, when said engaging means does not prevent said cartridge locking means from rotating due to said protrusion being pushed out from the interior of said cartridge tray to an exterior of said cartridge tray by said cartridge when said cartridge is inserted into said cartridge tray, said cartridge locking means acts to lock said cartridge to said cartridge tray, and
   wherein a plane, which is parallel to a rotation direction of said cartridge lock actuating means, is perpendicular to a plane which is parallel to a rotation direction of said cartridge locking means.

13. The cartridge tray according to claim 12, wherein said frame includes a pressing member pressing said cartridge tray in a direction such that said cartridge tray is placed at a predetermined position relative to said frame.

14. The cartridge tray according to claim 12, wherein said protrusion is attached to a top portion of said urging means near a leading end portion of said urging means.

15. The cartridge tray according to claim 14, wherein said engaging means extends from said protrusion to said leading end portion of said urging means.

16. The cartridge tray according to claim 12, wherein said protrusion comprises a resin material.

17. The cartridge tray according to claim 12, further comprising:
   a fastening means that extends through a fixing means of said cartridge lock actuating means and a corresponding fixing means of said cartridge tray, said fixing means of said cartridge lock actuating means formed through said urging means near a trailing end portion thereof,
   wherein said cartridge lock actuating means is fixed to said cartridge tray by said fastening means.

18. The cartridge tray according to claim 12, wherein said urging means comprises one of a twisted coil spring and a spring plate.

19. The cartridge tray according to claim 12, wherein, when said cartridge is removed from said cartridge tray after said cartridge has been pushing said protrusion and deflecting said urging means, said urging means regains an urging force to urge said protrusion to project into the interior of said cartridge tray.

20. The cartridge tray according to claim 12, wherein, when said cartridge is not in said cartridge tray, said protrusion is not displaced and said engaging means supports said cartridge locking means, thereby preventing said cartridge locking means from rotating to a position in which said cartridge locking means acts to lock said cartridge to said cartridge tray.

* * * * *